United States Patent
Burmester et al.

(10) Patent No.: US 8,469,055 B2
(45) Date of Patent: Jun. 25, 2013

(54) DEVICE FOR DRIVING A DOUBLE SEAT VALVE CAPABLE OF SEAT CLEANING

(75) Inventors: Jens Burmester, Grambek (DE); Matthias Suedel, Ratekau (DE)

(73) Assignee: GEA Tuchenhagen GmbH, Buechen (DE)

( * ) Notice: Subject to any disclaimer, the term of this patent is extended or adjusted under 35 U.S.C. 154(b) by 328 days.

(21) Appl. No.: 12/812,933

(22) PCT Filed: Sep. 19, 2008

(86) PCT No.: PCT/EP2008/007918
§ 371 (c)(1),
(2), (4) Date: Dec. 2, 2010

(87) PCT Pub. No.: WO2009/089853
PCT Pub. Date: Jul. 23, 2009

(65) Prior Publication Data
US 2011/0114866 A1 May 19, 2011

(30) Foreign Application Priority Data

Jan. 16, 2008 (DE) .......................... 10 2008 004 597

(51) Int. Cl.
*F16K 1/44* (2006.01)
*F16K 31/143* (2006.01)
(52) U.S. Cl.
USPC ........................ 137/614.18; 251/63; 251/63.5
(58) Field of Classification Search
USPC .. 137/312, 614.17–614.19, 238, 240; 251/62, 251/63, 63.5
See application file for complete search history.

(56) References Cited

U.S. PATENT DOCUMENTS

| 5,699,825 | A | * | 12/1997 | Norton | 137/238 |
| 6,047,730 | A | | 4/2000 | Coura et al. | |
| 6,179,003 | B1 | * | 1/2001 | Burmester | 137/614.18 |
| 6,186,163 | B1 | * | 2/2001 | Borg | 137/312 |
| 6,230,736 | B1 | * | 5/2001 | Scheible et al. | 137/312 |
| 7,032,878 | B2 | * | 4/2006 | Coura et al. | 251/129.04 |
| 7,198,058 | B2 | * | 4/2007 | Burmester | 137/312 |
| 7,905,253 | B2 | * | 3/2011 | Burmester et al. | 137/614.18 |

FOREIGN PATENT DOCUMENTS

| DE | 3133273 A1 | 3/1983 |
| DE | 19618235 C1 | 6/1997 |
| DE | 19608792 A1 | 9/1997 |
| DE | 38 35 944 C2 | 4/2000 |
| DE | 198 42 603 C2 | 4/2000 |
| EP | 0 545 846 A1 | 6/1993 |
| EP | 0 646 741 A1 | 4/1995 |
| WO | 9722821 A1 | 6/1997 |
| WO | 2005/093299 A1 | 10/2005 |
| WO | 2007/054131 A1 | 5/2007 |

* cited by examiner

*Primary Examiner* — Kevin Lee
(74) *Attorney, Agent, or Firm* — Vidas, Arrett & Steinkraus, P.A.

(57) ABSTRACT

A device for driving a double seat valve with two closing elements arranged in series and displaceable with respect to each other. A sleeve-shaped fourth drive piston pressurized by pressure medium, sealingly embraces a second drive piston on the circumference and can engage a catching connection in the direction of a first drive piston, wherein a second drive piston is adapted to be axially displaceable in a limited manner in both directions with respect to the first drive piston and in each case against the force of a second spring.

30 Claims, 6 Drawing Sheets

T2 = e-c

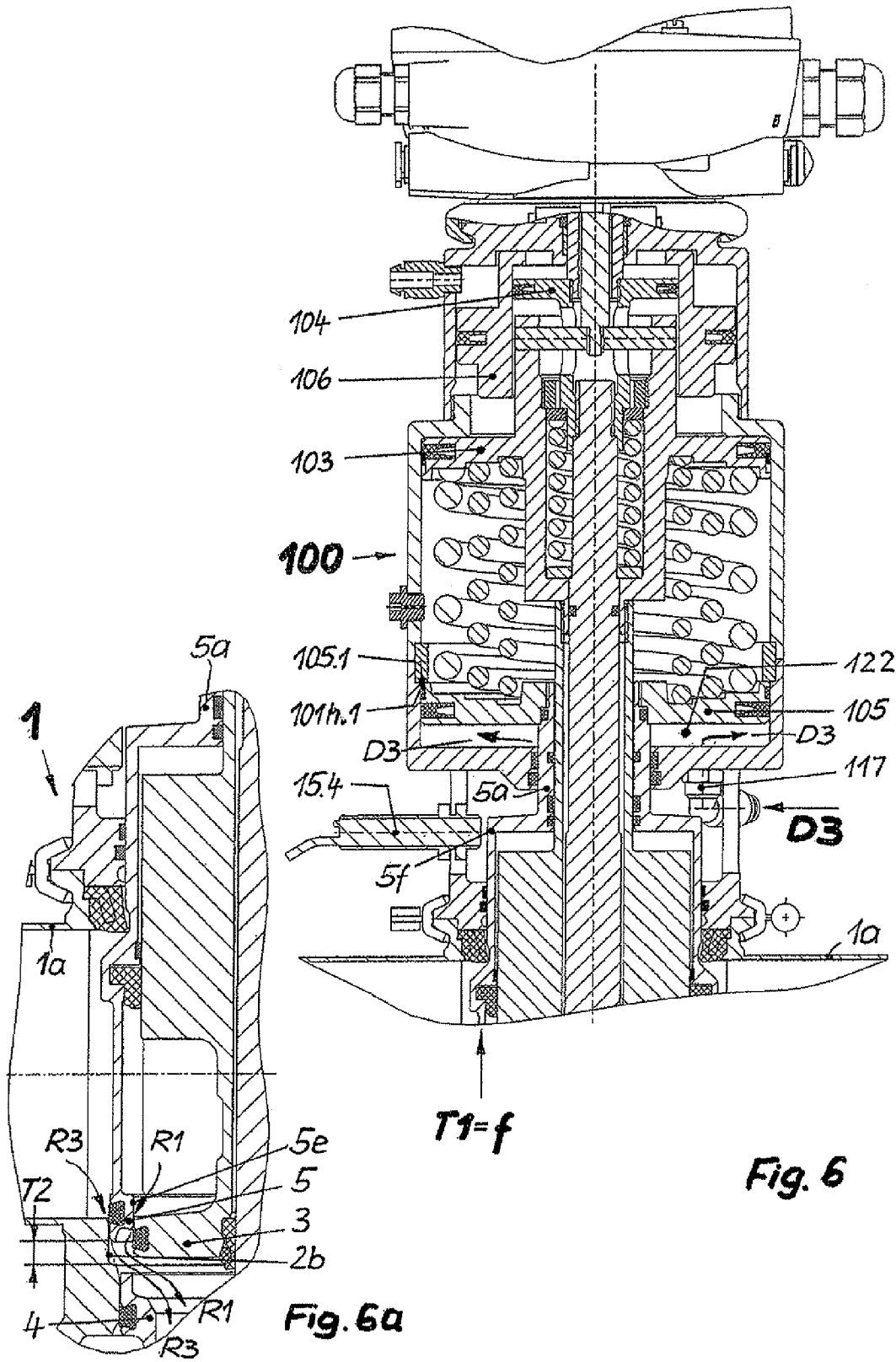

DEVICE FOR DRIVING A DOUBLE SEAT VALVE CAPABLE OF SEAT CLEANING

CROSS-REFERENCE TO RELATED APPLICATIONS

This is a national stage entry from PCT-Application No. PCT/EP2008/007918 filed on Sep. 19, 2008 claiming the priority of German Patent Application No. 10 2008 004597.7, dated Jan. 16, 2008.

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a device for driving a double seat valve with two closing elements, arranged in series and movable with respect to each other, which in the closed position of the double seat valve prevent the overflow of fluids from one valve housing part into another one through a connection opening connecting these valve housing parts of a valve housing with each other, and which in the closed position as well as in the open position of the double seat valve limit a leakage cavity that is connected to the surroundings of the double seat valve. In this, the second closing element is realised greater in diameter than the first closing element, so that the double seat valve opens in the direction of the second closing element as a consequence of this, an opening towards the downside being preferred. The device is destined to generate the opening and closing movements of the closing elements (fully open position H), and furthermore to transfer the closing elements into their respective seat cleaning position (partially open positions T1, T2), in order to rinse and clean the coaxial seating areas associated to the closing elements. The displacement rods of the closing element interlace telescopically into each other, and at one side, they are guided out of the valve housing and into the device.

For generating the opening and closing movement (fully open position H) of a double seat valve discussed here serves a so-called main displacement mechanism, and so-called individual displacement mechanisms are provided for generating each of the partially open positions T1 and T2. When the main displacement mechanism and the individual displacement mechanisms are housed in one common housing, one speaks of a so-called "integrated" drive device. A drive device for double seat valves referring to this is described in EP 0 868 619 B1 or in WO 2005/093299 A1, for instance.

From DE 31 33 273 C2, a drive device for double seat valves is known in which the individual displacement mechanisms for the respective partially open position are each additively inserted as autonomous displacement devices between the main displacement mechanism and a lantern housing. The main displacement mechanism generates exclusively the full stroke for the fully open position. The addition of the individual displacement mechanisms requires no change of the adjacent standard components of the main displacement mechanism and the lantern housing. The advantages achievable with this so-called "modular" drive concept are in particular that a much standardised double seat valve having a standard drive for the generation of the fully open position receives special functions by additive insertion of relatively simple individual displacement mechanisms, like the generation of partially open positions of the two closing elements.

In principle, one distinguishes between double seat valves that open towards the downside (for instance EP 0 646 741 A1) or towards the upside (for instance DE 196 08 792 C2).

A so-called leakage-free switching double valve arrangement which has essential features of the double seat valve capable of seat cleaning mentioned in the beginning is known from EP 0 646 741 A1. This double seat valve has two closing elements embodied as slide pistons, it opens towards the downside with respect to vertical standard position, and the drain of the leakage cavity takes place towards the downside also, namely via a pipe-shaped shaft that is formed on the downside situated closing element and in which a drain bore is disposed and which is guided towards the downside out of the valve housing. Independently from each other, by a partial stroke directed opposite to the opening movement, each of the two closing elements can be transferred into a rinsing position in which the respective closing element is free from its valve seat and rests on a housing stop that is provided with passages for a rinsing agent. In this, the passages for rinsing agent limit the amount of cleaning agent in the respective seat cleaning. The closing elements are actuated via displacement rods, which are both guided towards the upside, out of a valve housing and into a drive. In order to permit disassembly of the smaller upper closing element and of the lower greater closing element in one action towards the upside, the valve seats are provided with sealing rings that are held by housing inserts. These housing inserts are inserted into the valve housing from out the side facing the pipe-shaped shaft.

In the double seat valve of EP 0 646 741 A1, it is advantageous, like in all other double seat valves which open towards the downside and have a leakage drain guided out of the valve housing towards the downside, that in the open position of the double seat valve, the passage cross section of a connection opening connecting the two valve housing parts with each other is not narrowed by the cross section of the leakage drain. This reduces the rated width of the valve housing, determined by the passage cross section of the connection opening, for one to two standard widths in particular then when the passage cross section of the leakage drain between leakage cavity and surroundings of the double seat valve has to be equal to the greatest passage cross section of the pipeline connected to the double seat valve, as required in the USA for instance.

In the double seat valve of EP 0 646 741 A1, it is disadvantageous that this switches at best in a leakage reduced, but not as the title pretends leakage free manner. The switching leakage results from the fact that in the space that is limited between the two seat seals at the valve housing side on the one hand and at the closing element side on the other hand, liquid is included upon every opening or closing stroke, and that this liquid arrives in the leakage cavity and from there in the leakage drain after the separation of the two closing elements on the central seal that acts between the two. It is further disadvantageous that the respective seat cleaning flow, which arrives through the rinsing agent passages on the associated housing stop and is predominantly axially/radially oriented, impinges in a more or less uncontrolled and turbulent manner on the seat seal of the other closing element that is in the closed position.

With the double seat valve of EP 0 646 741 A1, the amount of cleaning agent can be limited in the respective seat cleaning as desired. However, the requirements which are imposed to such a double seat valve in certain countries are even more extensive. For instance, in the USA it is required that upon greater seal failures or even upon the loss of one of the two seat seals during the seat cleaning of the other closing element, no cleaning agent may pass through via the respective seal failure or the seat region without seat seal. Under these circumstances, such a double seat valve is imposed the requirement not only to limit the amount of cleaning agent and to avoid a direct impingement thereof on the seat regions during the seat cleaning, but also to discharge the seat cleaning flow with as little turbulences as possible into the leakage cavity at first and from there into the surroundings, without that the respective closed seat region is directly flown against or impinged under pressure increase by this seat cleaning flow.

With direct impingement is meant every velocity component of the respective seat cleaning flow that is directed vertically against the walls that limit the seat region. Namely, it has proven that each direct impingement related to this results in a conversion of kinetic flow energy into static pressure. Depending on the impact angle of the flow on the wall- or body surface that is flown against, a branch flow with a so-called branch streamline results, the latter dividing the flow into two halves. The branch streamline itself impinges onto the so-called stagnation point, so that the velocity is zero at this point. The pressure increase occurring as a consequence of this stopping down of the velocity is also designated as ram pressure. The pressure increasing mechanisms pointed out above generate a leakage flow via the respective choke gap and the deficient or no more present at all seat seal. Thus, any direct impact of the seat cleaning flow on the surfaces limiting the leakage cavity is counter-productive in every case.

A double seat valve that opens towards the upside with respect to a vertical standard position and is capable of seat cleaning is known from DE 196 08 792 C2. In this double seat valve, the amount of cleaning agent in the respective seat cleaning can be controlled by so-called choke gaps and can be assessed very narrowly. Furthermore, a direct impact on the respective closed seating area during the seat cleaning of the other seating area is prevented by guiding and directing the seat cleaning flow.

The double seat valve of DE 196 08 792 C2 is provided with two so-called seat cleaning positions, wherein the first seat cleaning position is generated by a first partial stroke directed opposite to the opening stroke. In this position, the cylindrical lug disposed on the first closing element at the leakage space side forms a so-called choke gap with the associated cylindrical first seating area, via which the amount of cleaning agent supplied from the neighbouring first valve housing part can be limited. The seat cleaning position of the second closing element takes place by a second partial stroke directed like the opening stroke, wherein in the partially open position, the cylindrical lug disposed on the second closing element at the leakage space side forms a second choke gap with the associated part of the connection opening, which limits the amount of the second seat cleaning flow generated in this seat cleaning position.

Because the two closing elements and the associated cylindrical lugs have different diameters, the respective associated portions of the connection opening have also different diameters, so that a transition area results between these two diameters. In the seat cleaning position of the first closing element, the first seat cleaning flow flows along the cylindrical seating area and hits the front side limitation on the second closing element, wherein at least a direct impact of the first seat cleaning flow on the second choke gap, and by this on the seat region of the second closing element, is prevented through the diameter difference of the two portions of the connection opening. In the seat cleaning position of the second closing element, the second seat cleaning flow is radially deflected towards the inside on the transition area that bridges the diameter difference between the portions of the connection opening, and is guided past the upper front side periphery of the first closing element. Even in this case, a direct impact of the second seat cleaning flow on the first choke gap and by this on the seat region of the first closing element is prevented through this.

From WO 2007/054131 A1, a double seat valve that opens towards the upside and is capable of seat cleaning is known, which is improved against the previously described state of the art amongst others in that a discharge of the seat cleaning flow, as free of turbulences as possible, into and out of the leakage cavity is secured and a pressure-increasing direct impact on the seat regions is safely avoided. This is achieved amongst others by a transition area between the two seating areas of the closing elements and an annular recess in the form of a special deflection area in the dependently driven greater closing element. A central seal is arranged between the two closing elements, so that even in this closing element configuration, one might rather call it a leakage-reduced than a leakage-free switching in the strict sense.

From WO 2007/054134 A1, a double seat valve that opens also towards the upside and is capable of seat cleaning is furthermore known, which is improved against the previously described state of the art according to WO 2007/054131 A1 in that it switches without leakage to a very large extent. This is achieved in that at its end facing the smaller, independently driven closing element, the dependently driven greater closing element has a recess with an essentially cylindrical circumference wall falling in line with the seating area of the smaller closing element, and the recess is dimensioned such as to sealingly receive an end portion and a radial seal of the smaller closing element during the opening movement before the greater closing element opens.

DE 196 18 235 C1 describes a double set valve opening towards the downside with a controlled leakage space, which is equipped with two sealing sites which are arranged in series and in planes that are parallel to each other and which prevent the overflow of fluids from one valve housing part into the other in the closed position of the double seat valve. The leakage space is arranged between the sealing sites and connected at the valve housing side with the surroundings of the double seat valve. The double seat valve has three translationally displaceable closing parts, each realised like a slide. A first closing part is displaceable between a closed and an open position, wherein in the opened position of the double seat valve, it connects the inner spaces of the two valve housing parts with each other via a passage opening that is provided therein radially at the inside. In the closed position of the double seat valve, the above mentioned first closing part realises the first sealing site with the first valve housing part on the one hand. On the other hand, in the closed position of the double seat valve, a second closing part forms the second sealing site with the second valve housing part. In every other position than in the opened position of the double seat valve, a third closing part is sealingly displaced within the passage opening, and during the opening movement of the double seat valve, it sealingly rests on the second closing part and is transferred into the open position with the same.

Each of the three closing parts has one displacement rod, which is guided into a device for driving the double seat valve. This drive device has the function to realise the opening and closing movement of the above-mentioned double seat valve with the three closing parts by one single pressurised drive piston which is displaceable against the force of different springs. The double seat valve is not capable of seat cleaning, and thus, the known drive device does not have any driving means and displacement functions related to this in order to generate the partial stroke movement of the first and second closing part which is necessary for the respective seat cleaning.

It is the objective of the present invention to provide a device as simple as possible for driving a double seat valve which is capable of seat cleaning, opens toward the downside and switches without leakage, and which furthermore avoids a pressure-increasing direct impact on the closed seat region in the respective seat cleaning and ensures a discharge of the seat cleaning flow into and out of the leakage cavity that is as free of turbulences as possible.

BRIEF SUMMARY OF THE INVENTION

Advantageous embodiments of the device of the present invention are described in the subclaims.

In order to achieve the objective, a device is proposed which provides the closing element kinematics for a double seat valve which, in a preferred embodiment, is altogether equipped with all those features which are each partly realised in the above shortly outlined double seat valves, and which in the sum generate the following desirable properties and functions of a double seat valve capable of seat cleaning, related to its vertical normal position:
- two closing elements connected in series, preferably embodied as slide pistons, whose respective seat seal cooperates with the associated, then necessarily cylindrical seating area radially, i.e. in the so-called slip engagement;
- leakage free closing element shaping and kinematics;
- opening movement of the double seat valve towards the downside;
- drain of the leakage cavity towards the downside;
- actuation of the closing elements by displacement rods, which are guided towards the upside in common, out of the valve housing to a drive;
- capability to disassemble the two closing elements towards the upside;
- controlled limitation of the cleaning agent amount in the seat cleaning, preferably by choke gaps;
- avoidance of a pressure-increasing direct impact on the seat region being in the closed condition during the respective seat cleaning;
- turbulence-free discharge of the seat cleaning flow into and out of the leakage cavity.

According to the present invention, each of the two closing elements and also the slide part is fixedly connected to a drive piston via the associated displacement rod. A first solution approach is that the proposed device has a second drive piston, pressurised by pressure medium and fixedly connected to the second displacement rod and displaceable against the force of a second spring, the second spring being supported at the other side directly or indirectly on the first drive piston, and the second displacement rod being sealingly guided through the first displacement rod that is realised as a hollow rod in connection with the first drive piston. In this, the second drive piston is displaceable with respect to the first drive piston connected to the first closing element in such a way that it can be axially displaced in a limited manner in both directions and in each case against the force of the second spring. This particular property of the second drive piston makes the device capable to provide the kinematics necessary for the second drive piston in connection with the opening- and closing movement, the associated seat cleaning position and in case for a so-called pick-up position in a relatively simple and straightforward manner. According to the present invention, the opening and closing movements are initiated in that the first and the second drive piston, which partly limit a first pressure medium space pressurised by a first pressure medium flow, move away from each other in this pressurization.

A second solution approach is based on the axial movability of the second drive piston in accordance with the first solution approach, and it consists in that the device has a fourth drive piston, preferably realised as sleeve-shaped and pressurised by pressure medium, which sealingly embraces the second drive piston on the circumference surface thereof and is adapted to be brought into engagement in a catching connection with the second drive piston in the direction of the first drive piston. On their front surfaces facing away from the first drive piston, the second and the fourth drive piston partially limit a second pressure medium space pressurised by a second flow of pressure medium, and they each move in the direction towards the first drive piston in this pressurization. Through this, the fourth drive piston has a catching function for the second closing element during the partial stroke movement for securing the seat cleaning position, and a function determining the amount of this partial stroke with respect to the second closing element or the second drive piston, respectively, on the one hand, and on the other hand, when needed it determines and limits by its catching function the then desired pick-up stroke with respect to the latter one.

In case that leakage-free switching is desired or required, according to a preferred embodiment the device can be designed such that in the closed position of the first closing element and during the opening movement of the double seat valve, it guides the second closing element towards the first closing element by a pick-up stroke at first, in that the second drive piston rests on the fourth drive piston after the pick-up stroke when it is pressurised by the first flow of pressure medium. Leakage-free switching is in principle favoured furthermore in that, as this is also provided, the annular slide part, the first, the second and also the third seating area are each realised cylindrically and the closing elements each as slide pistons, and that the device provides the necessary kinematics for this embodiment.

According to a further proposition, best results with respect to leakage-free switching are achieved in that the device is also capable to actuate a double seat valve in which the second closing element at its end facing the first closing element, has a recess with an essentially cylindrical circumference wall falling in line with the first seating area, and the recess is dimensioned such as to sealingly receive the first closing element during the opening movement before the second closing element opens.

According to another proposition, the limitation of the cleaning agent amount in the respective seat cleaning of the double seat valve is successful in that the device provides the kinematics for a double seat valve which features the following generation of a choke gap:
- with a cylindrical second lug arranged on the second closing element at the leakage space side, which forms an annular second choke gap with the associated second seating area after the completion of the second partial stroke,
- with a cylindrical first lug arranged on the first closing element as to be facing away from the leakage space side, which forms an annular first choke gap with the associated first seating area after the completion of the first partial stroke, and with a cylindrical third lug arranged on the slide part at the leakage space side, which forms an annular third choke gap with the associated third seating area after the completion of the first partial stroke.

The proposed device is also capable to actuate a double seat valve in which a pressure-increasing direct pressurization of the closed seat region is avoided in the respective seat cleaning, and a discharge of the seat cleaning flow into and out of the leakage cavity that is free of turbulences as far as possible is secured. For this purpose, a transition area is provided between the second and the third seating area, and an annular second recess in the form of a deflection area is disposed in the front side of the slide part facing the leakage cavity.

The proposed device is simplified in that the first and the third drive piston, both pressurized by pressure medium and each being displaceable against the force of a spring, use the service of the same spring. This is successful in that the first housing is formed by a pot-shaped first and a pot-shaped second housing part, that the first drive piston is lodged in the first and the third drive piston in the second housing part and they are each sealingly guided at the perimeter side there, and receive the first spring between each other In order to design and produce the housing consisting of the two housing parts and receiving the first and the third drive piston in a manner as simple as possible, a connection ring is provided, which joins and centres the lateral areas of the housing parts at the inner side, wherein the connection between the housing parts and the connection ring is preferably by substance to substance bond.

In order to receive the second and the fourth drive piston embracing the former at the perimeter side, a pot-shaped second housing is provided, which is attached at the outer side on an annular lug which encloses a first passage opening on a first bottom part of the first housing part. Via the first passage opening, the respective spaces that are limited by the first drive piston at the one side and by the second and the fourth drive piston at the other side are advantageously connected with each other to form the first pressure medium space that is pressurized by the first pressure medium flow.

According to a further embodiment, the proposed device permits the detection of the closed and the open position as well as of the seat cleaning position after the completion of the second partial stroke. For this purpose, at least three position detectors are disposed in a control unit connected to a housing bottom of the second housing, wherein the housing bottom has a central third passage opening in which a second feedback rod fixedly connected with the second drive piston, realised as a hollow rod and engaging into the control unit, is sealingly guided. The latter is penetrated by a first feedback rod that is directly or indirectly fixedly connected to the first drive piston and engaging into the control unit. In this, the position detectors detecting the closed and the open position are associated to the first feedback rod, and the third position detector detecting the second partial stroke is associated to the second feedback rod.

According to an advantageous embodiment, the axially limited movability of the second drive piston, provided in both directions and in each case against the force of a spring, is achieved in that the first drive piston has a pot-shaped first piston shaft, which is detachably connected with the first displacement rod in the region of the pot bottom and sealingly penetrated by the second displacement rod there, that in a central cylindrical recess engaging in the first piston shaft from out the open side is disposed the second spring, which is supported under prestress via a first abutment disc on the pot bottom at the one side, and via a second abutment disc on the first piston shaft at the other side, wherein the second displacement rod penetrates the abutment discs in an axially displaceable way, and in the direction towards the second spring it is adapted to be put into engagement in a catching connection with the respective abutment disc that is in the run.

Although the second drive piston is an obstacle to a mechanical extension into the control unit of the first displacement rod that is realised as a hollow rod and fixedly connected to the first closing element, the above mentioned feedback rod referring to this may be indirectly or directly securely coupled to the first drive piston in that a transverse rod diametrically bridging over the cylindrical recess is provided in the region of the outlet end of the pot-shaped first piston shaft, that the transverse rod penetrates there a sleeve-shaped second piston shaft fixedly connected to the second drive piston within a slot-like shaped cross hole in such a way that it can be axially displaced in a limited manner, and that the transverse rod is fixedly connected to the first feedback rod.

During the pick-up movement in the opening and closing stroke, the second drive piston rests on the fourth drive piston after a defined pick-up stroke, and during the second partial stroke, the fourth drive piston engages into a catching connection with the second drive piston. In order to ensure these effects of the fourth drive piston, the present invention proposes that at its end facing away from the first drive piston, the sleeve-shaped fourth drive piston is provided with an inside recess, which forms the catching connection with the second drive piston on the one hand, and on the other hand a twelfth contact surface for the same.

In order to ensure the order of the closing element movements during the opening movement that is provided in the present invention, namely pick-up stroke at first, subsequently advancing the first closing element into the recess in the second closing element and finally common further opening movements up to the fully open position, or to ensure this analogously in the closing movement in the reversed order, the piston area of the first drive piston that is effective when pressurised by pressure medium, is greater than the piston area of the second drive piston that is effective when pressurised by pressure medium, and the prestress force of the first spring is made greater than the prestress force of the second spring. In this context, a first spring, advantageously compact and providing a sufficiently great prestress force, is realised in the form of a spring packet with an outer, a middle and an inner spring.

The proposed device has three pressure medium spaces that are independent from each other. The first pressure medium space is limited by the first and the second housing and the first drive piston at the one side, and by the second and the fourth drive piston at the other side. As a first proposition provides, a first pressure medium channel destined for the first pressure medium flow runs out into the first pressure medium space, wherein this channel is guided thereto in an extension of the second drive piston penetrating the second housing. According to a second proposition, a ring channel between the second feedback rod and the first feedback rod runs out into the first pressure medium space, and thus it forms a first pressure medium channel for the first pressure medium flow. The second pressure medium space is limited by the second housing at the one side, and by the second and the fourth drive piston at the other side, and a third pressure medium space is limited by the first housing at the one side, and by the third drive piston at the other side. The respective associated second and third pressure medium channel is guided thereto via a connection piece on the respective mentioned housing in a per se known manner.

In order to secure the closed position of the first closing element and to limit the open position of the two closing elements and of the first and the second partial stroke, the device provides separate stops in each case, which are described in more detail in the claims, the figures of the drawings and in the associated description. The closed position of the slide part is secured by the rest thereof on a transition area in the seat region of the double seat valve which bridges over the first and the second seating area.

In order to detect the completion of the first partial strike also, a further embodiment provides that a fourth position detector is disposed on a lantern housing connecting the valve housing with the first housing, which detects the first partial stroke via the third displacement rod (connection bridge) connected to the slide part.

BRIEF DESCRIPTION OF THE SEVERAL VIEWS OF THE DRAWINGS

A more exhaustive representation results from the following description and the annexed figures of the drawing and from the claims. Whereas the present invention is realised in very different embodiments, a realisation example of a preferred embodiment of the proposed device for driving a double seat valve that is capable of seat cleaning, and also a preferred embodiment of the double seat valve capable of seat cleaning itself are depicted in the drawing and described according to construction and function in the following, with the proviso that these embodiments represent only an example for the present invention, but the invention is not restricted to these specially depicted examples. It is shown in FIG. 1 the double seat valve capable of seat cleaning of the present invention in a longitudinal and meridional section below its drive, wherein the double seat valve is in its closed position;

FIG. 2a a longitudinal and meridional section in the seat region and in the region adjacent thereto towards the upside in an enlarged representation, according to a detail designated by "A" in FIG. 1, wherein the position of the closing elements and of the slide part determines the position of the device according to FIG. 2;

FIG. 3a a longitudinal and meridional section in the seat region and in the region adjacent thereto towards the upside in an enlarged representation, according to a detail designated by "A" in FIG. 1, wherein the position of the closing elements and of the slide part determines the position of the device according to FIG. 3;

FIG. 6 the device of the present invention according to FIG. 2 in a longitudinal and meridional section, wherein the position of the device corresponds to a so-called seat cleaning position for the upside situated first closing element of the double seat valve;

FIG. 6a a longitudinal and meridional section in the seat region and in the region adjacent thereto towards the upside in an enlarged representation, according to a detail designated by "A" in FIG. 1, wherein the position of the closing elements and of the slide part determines the position of the device according to FIG. 6.

DETAILED DESCRIPTION OF THE INVENTION

Figure 1:
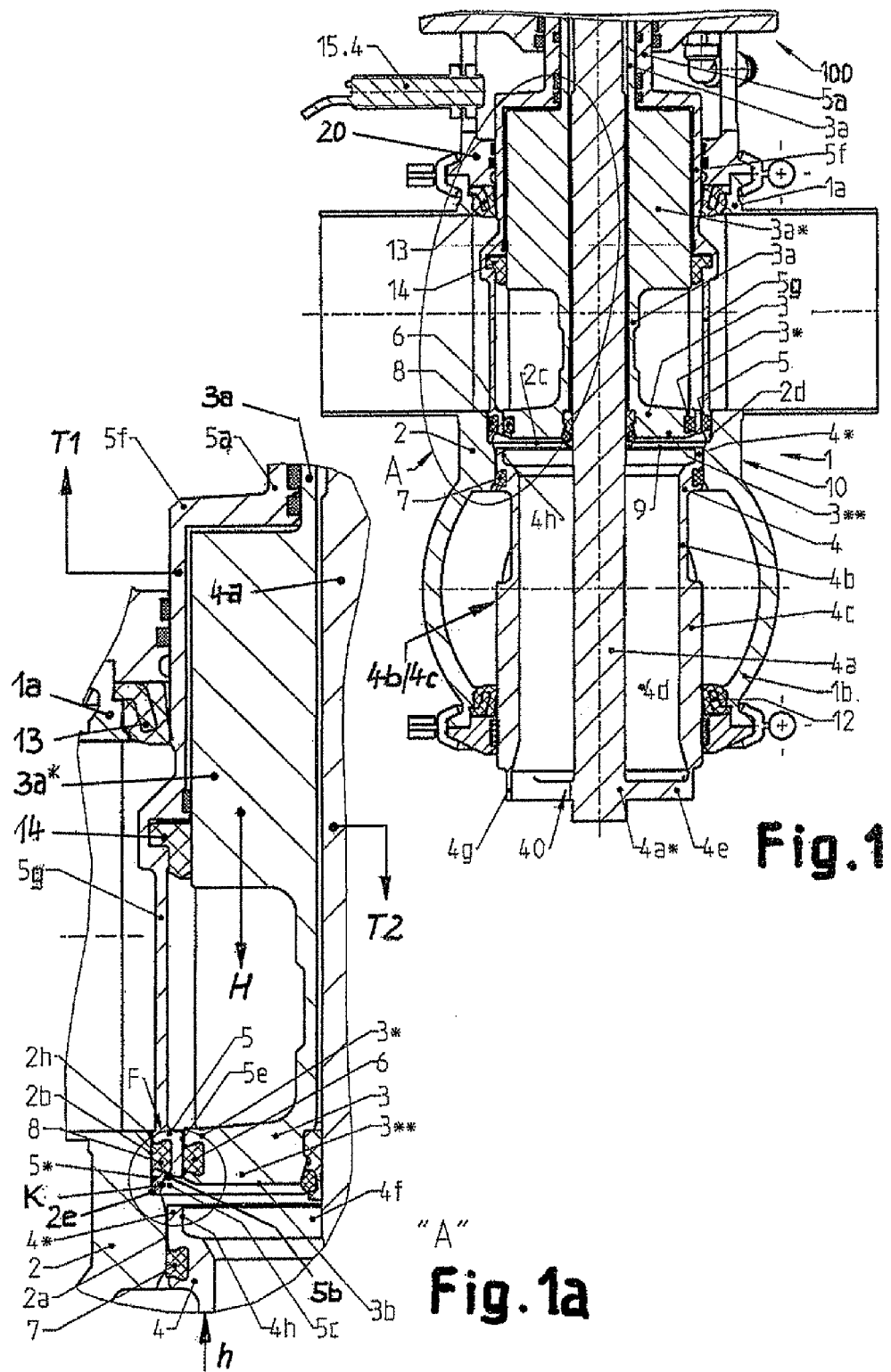
FIG. 1a a longitudinal and meridional section in the seat region and in the region adjacent thereto towards the upside in an enlarged representation, according to a detail designated by "A" in FIG. 1.

While this invention may be embodied in many different forms, there are described in detail herein a specific preferred embodiment of the invention. This description is an exemplification of the principles of the invention and is not intended to limit the invention to the particular embodiment illustrated A double seat valve 1 of the present invention realised in a preferred embodiment (FIGS. 1, 1a), for whose drive a device 100 (FIG. 2) according to the present invention is provided, essentially consists of a valve housing 10 with first valve housing part 1a, disposed at the upside with respect to its normal position, and a second valve housing part 1b disposed below it, two individually displaceable closing elements 3 and 4 with the respective associated displacement rods 3a and 4a, respectively, and a first seat ring 2, which produces a connection between the valve housing parts 1a, 1b via a connection opening 2c at the inside.

An axially displaceable, cylindrical annular slide part 5 is sealingly received radially at the outside in a cylindrical third seating area 2b formed in the upper part of the connection opening 2c, said seating area being formed there by an annular first recess 2d (FIG. 1a), and the slide part 5 forms a cylindrical first seating area 5e radially at the inner side, which runs coaxially to the connection opening 2c and is in fluid communication with the latter. The outside sealing of the slide part 5 takes place via a radially acting third seal 8 arranged in the same (sealing in the so-called slip engagement).

The upside situated, first closing element 3, realised as a slide piston (active or independently driven closing element) is sealingly received in the first seating area 5e in the closed position of the double seat valve 1. For this purpose, a first seal 6 is provided in the first closing element 3, which co-operates with the first seating area 5e exclusively by radial prestress (radial seal in slip engagement). The downside situated, second closing element 4, also realised as a slide piston (passive or dependently driven closing element) co-operates with a second seating area 2a in the closed position of the double seat valve 1, which is executed cylindrically and realised in the lower part of the closing element 2c. Its sealing takes place via a second seal 7 disposed in the second closing element 4, which radially seals with respect to the second seating area 2a (sealing in the so-called slip engagement).

In the depicted closed position as well as in an open position, the two closing elements 3, 4 form a leakage cavity 9 between themselves (see also FIG. 4a), which is connected to the surroundings of the double seat valve 1 via a drain bore 4d which centrically penetrates a pipe-shaped shaft 4b/4c formed on the second closing element 4. The pipe-shaped shaft 4b/4c is formed by a connection part 4b adjoining the second closing element 4 and a second pressure compensation piston 4c that continues on the latter.

Regarding the double seat valve 1, it is provided to relocate the mechanically necessary connection points between the second closing element 4 and the second displacement rod 4a in the form of three tie bars 4e (FIG. 1) distributed evenly over the circumference and permeating the drain bore 4d star-like and in the radial direction, into some distance from the leakage cavity 9, preferably towards the end of the second pressure compensation piston 4c facing away from the second closing element 4. The fixed connection with the pressure compensation piston 4c takes place via a circumferential ring 4g, to which the tie bars 4e are fixedly connected radially at the outside. In a practical manner, the tie bars 4e, the ring 4g and a displacement rod portion 4a* are combined in a one-piece welding boss 40. Negative effects on the flow conditions and the flow configuration in the leakage cavity 9 are avoided by this arrangement.

The second seating area 2a has a diameter which is smaller than the diameter of the third seating area 2b associated to the slide part 5 at the outside, a transition area 2e being provided between the second and the third seating area 2a, 2b (FIG. 1a).

Figures 4, 4A:
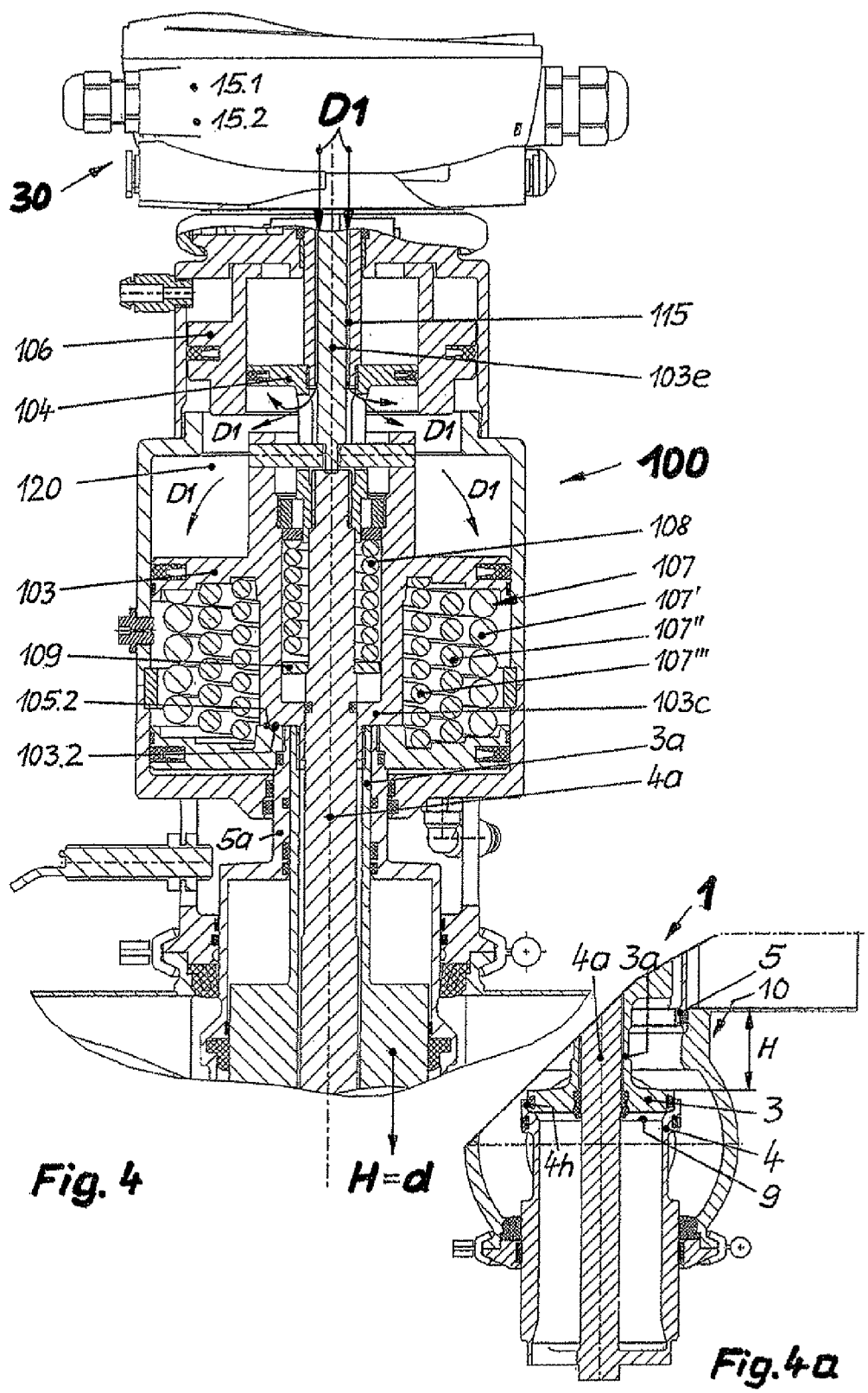
FIG. 4 The device of the present invention according to FIG. 2 in a longitudinal and meridional section, wherein the position of the device corresponds to the open position of the double seat valve.
FIG. 4a a longitudinal and meridional section in the seat region and in the region of the two closing elements being in their open position, wherein the position of the closing elements and of the slide part determines the position of the device according to FIG. 4.

The first drive piston 3, sealingly received in the first seating area 5e in its closed position, finds rest on the second closing element 4 during its opening movement, and transfers the latter also into an open position H in the continued opening movement (FIG. 4a). On a first end portion 3 (FIG. 1a), the first closing element 3 has the first seal 6, which radially seals in the first seating area 5e. On its end facing the first closing element 3, the second closing element 4 has a recess 4f with an essentially cylindrical circumference wall 4h in line with the first seating area 5e, wherein the recess 4f is dimensioned such as to sealingly receive the first end portion 3* and the radial first seal 6 of the third closing element 3 during the opening movement, before the second closing element 4 opens.

Figure 3:
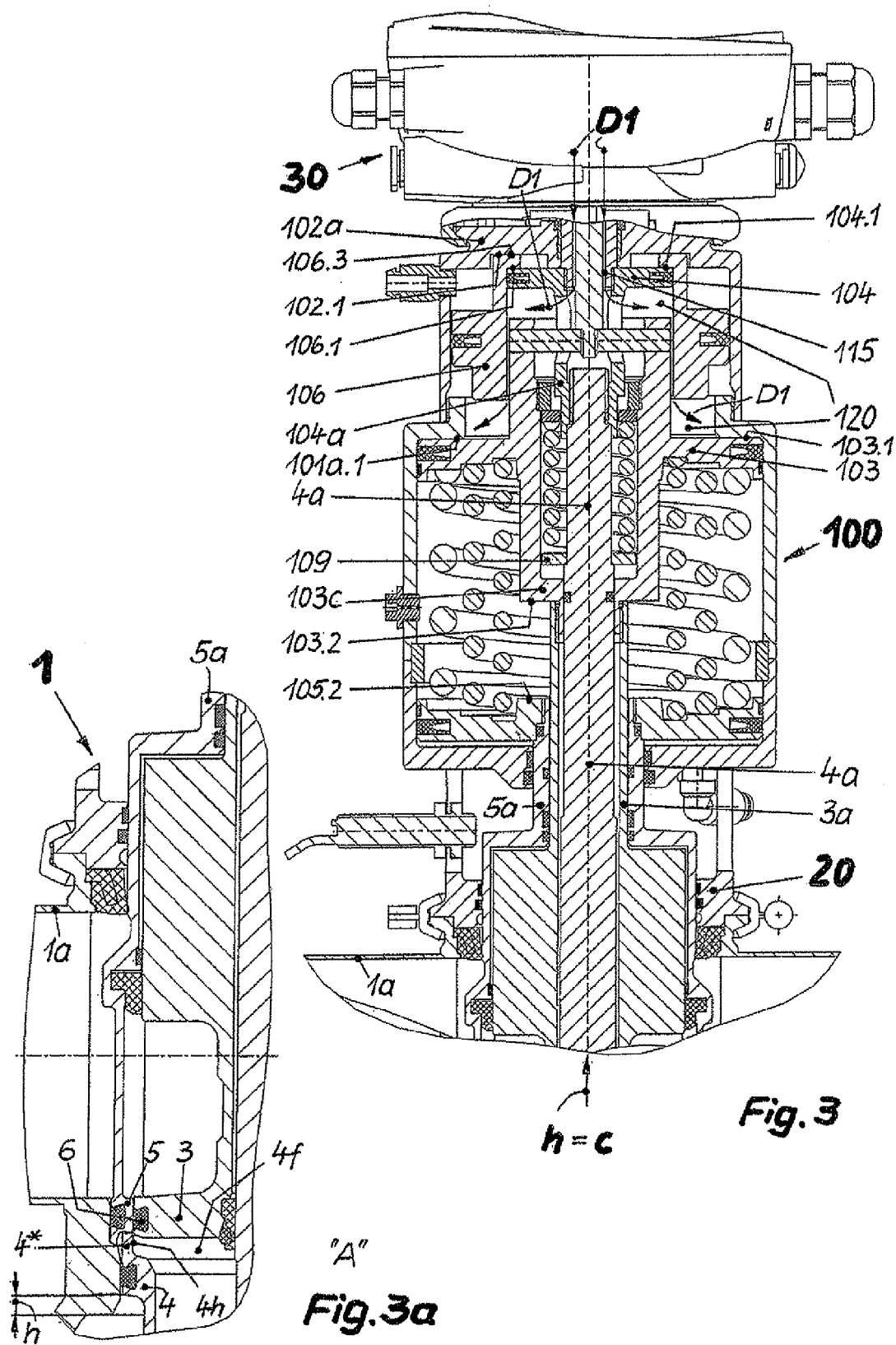
FIG. 3 the device of the present invention according to FIG. 2 in a longitudinal and meridional section, wherein the position of the device corresponds to a so-called pick-up position of the downside situated second closing element of the double seat valve.

The double seat valve 1 has a peculiarity which is hitherto without paragon in the state of the art. It is dealt with a so-called pick-up position of the second closing element 4, before the independently driven first closing element 3 begins its opening movement with the purpose to transfer the double seat valve 1 from its closed position into the fully open position H. For this purpose (FIG. 3a), opposite to its later opening movement, the second closing element 4 is guided towards the slide part 5 about a pick-up stroke h with the front surface of a cylindrical second lug 4* (FIG. 1a, 3a), and there it finds rest directly adjacent to the slide part 5 and the neighbouring first closing element 3. A second annular recess 5c in the slide part 5 corresponds to the engagement region of the second lug 4*, so that the cylindrical second lug 4* is advanced into the second recess 5c during the pick-up movement, and finds rest there on the end of the recess 5c radially at the inner side, the last portion of a contour K of a deflection area 5b. Now, without having to bridge an axial circumferential gap, the first closing element 3 can advance its first seal 6 directly into the circumference wall 4h in line with the first seating area 5e, and by this into the recess 4f in the second closing element 4.

Figures 5, 5A:
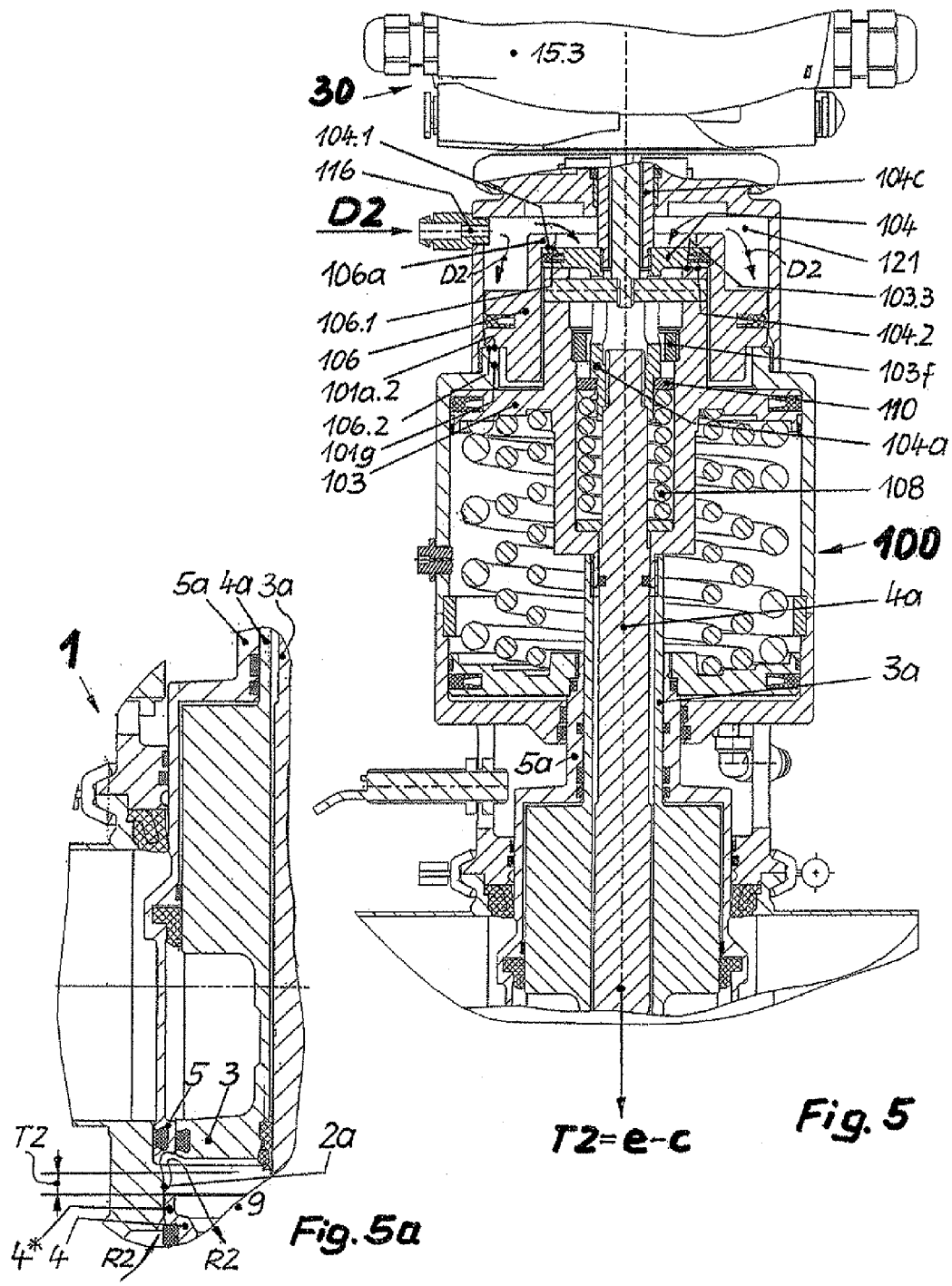
FIG. 5 the device of the present invention according to FIG. 2 in a longitudinal and meridional section, wherein the position of the device corresponds to a so-called seat cleaning position for the downside situated second closing element of the double seat valve.
FIG. 5a a longitudinal and meridional section in the seat region and in the region adjacent thereto towards the upside in an enlarged representation, according to a detail designated by "A" in FIG. 1, wherein the position of the closing elements and of the slide part determines the position of the device according to FIG. 5.

The double seat valve 1 has seat cleaning positions for the closing elements 3, 4 and the slide part 5 for rinsing their coaxial seating areas 5e, 2a, 2b, wherein the second closing element 4 can be transferred by a second partial stroke T2 directed like the opening movement (FIG. 5a), and the slide part 5 by a first partial stroke T1 directed opposite to the opening movement (FIG. 6a) into their respective seat cleaning positions. The cylindrical second lug 4*, provided on the second closing element 4 at the leakage cavity side, is equipped with a second diameter at the outside (FIGS. 5a, 1a), which forms an annular second choke gap with the associated second seating area 2a after the completion of the second partial stroke T2, by which a second seat cleaning flow R2 is limited in a defined manner. A cylindrical first lug 3* assessed with a first diameter at the outside is disposed on the first closing element 3 at the side facing away from the leakage cavity (FIGS. 6a, 1a), which forms an annular first choke gap with the associated first seating area 5e after the completion of the first partial stroke T1, by which a first seat cleaning flow R1 is limited in a defined manner. A cylindrical third lug 5* assessed with a third diameter at the outside is disposed on the slide part 5 at the side of the leakage cavity (FIGS. 6a, 1a), which forms an annular third choke gap with the associated third seating area 2b after the completion of the first partial stroke T1, by which a third seat cleaning flow R3 is limited in a defined manner. From FIG. 1a, it becomes furthermore clear that that the third seating area 2b has a seal-gentle lead-in chamfer 2h for the third seal 8, wherein this lead-in chamfer is effective when the slide part 5 reverts from its seat cleaning position into its closed position.

Through the location of the first choke gap on the one hand, and through that of the third seat cleaning flow R3 on the other hand, the first seat cleaning flow R1 leaving the first choke gap is a priori positioned such that the two seat cleaning flows R1, R3 are not directed towards the seat region of the second seal 7. Moreover, the radial width of the transition area 2e must also ensure the realisation of a contact surface at the valve housing side (FIG. 1a) for the slide part 5, so that a solid (metallic) stop of the slide part 5, directly neighbouring the leakage cavity 9, onto the first seat ring 2 can be realised. The contact surface at the valve housing side corresponds to a contact surface that is provided on the front side of the cylindrical third lug 5*. In the front side of the slide part 5 facing the leakage cavity 9 is disposed the annular second recess 5c in the form of the deflection area 5b (FIG. 1a). In the open position of the double seat valve (FIG. 4a), when a full opening stroke is realised, it becomes clear that the first closing element 3, radially sealing in the circumference wall 4h by its first seal 6, provides for a safe sealing of the two closing elements 3, 4 between the inner space of the valve housing 10 on the one hand, and the leakage cavity 9 on the other hand.

The double seat valve 1 (FIGS. 1, 1a) has the device 100 (FIG. 2) for its drive, which is disposed above the first valve housing 1a and connected with the latter via a lantern housing 20. The slide part 5 (FIG. 1a, 1) is connected via fluid-permeable connection bridges 5g with a pot-shaped accommodation cylinder 5f open towards the slide part 5, which penetrates the associated first valve housing part 1a in a displaceable and via a second housing seal 13 sealing manner, and continues at its end facing away from the slide part 5 into the third displacement rod 5a realised as a hollow rod 5a, which is guided into the device 100. The first displacement rod 3a, connected with the first closing element 3, realised as a hollow rod and also guided into the device 100, penetrates the accommodation cylinder 5f in a displaceable and concentric manner, at its entrance site into the accommodation cylinder 5f it is sealed with respect to the same via a cylinder seal 14, and in the engagement region with the accommodation cylinder 5f it is realised as a first pressure compensation piston 3a*, whose outer diameter comes up to the outer diameter of the first closing element 3 in the limiting case.

The second displacement rod 4a, connected with the second closing element 4, concentrically penetrates the first displacement rod 3a realised as a hollow rod and is guided into the device 100. At the end facing the device 100 of the second displacement rod 4a, the latter is connected with the pipe-shaped shaft 4b/4c formed on the second closing element, preferably via the welding boss 40. In its region sealingly penetrating the associated second valve housing 1b via a first housing seal 12, this shaft is realised in the form of the second pressure compensation piston 4c, whose outer diameter comes up to the outer diameter of the second closing element 4 in the limiting case. In this, due to the features of the double seat valve 1, the drain bore 4d penetrating the second pressure compensation piston 4c can be dimensioned such that its passage cross section is equal to the passage cross section of the greatest pipeline that is connected to the valve housing parts 1a, 1b.

Figure 2:
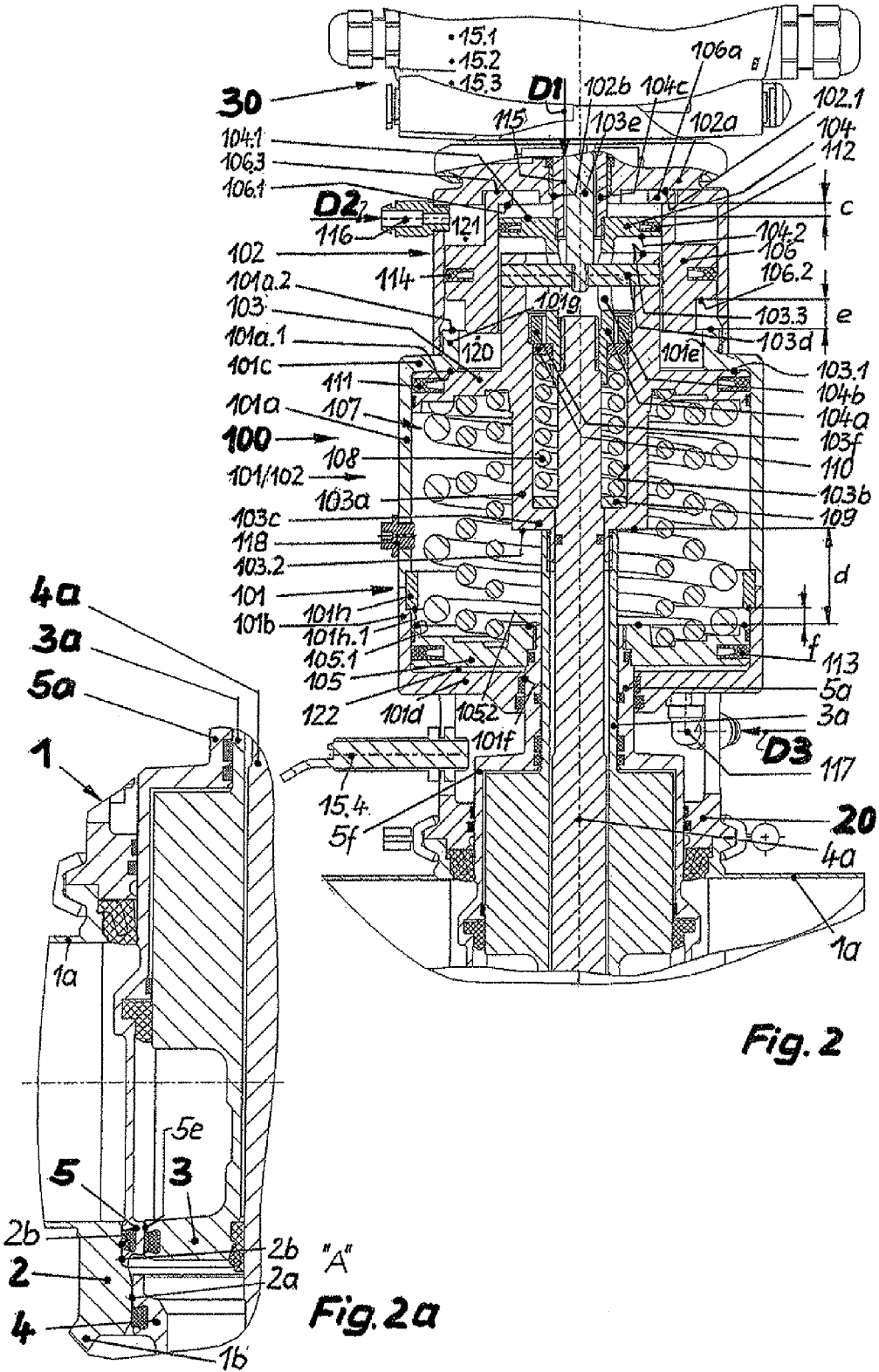
FIG. 2 The device of the present invention for driving the double seat valve capable of seat cleaning according to FIG. 1 in a longitudinal and meridional section, wherein an adjacent lantern housing is represented at the downside, and a part of a control unit at the upside, and the position of the device corresponds to the closed position of the double seat valve.

In a control head 30 partly depicted in FIG. 2, which is disposed on the side of the device 100 facing away from the double seat valve 1, a first and a second position detector 15.1, 15.2 for detecting the closed and the open position are arranged, and also a third position detector 15.3 by which the second partial stroke T2 of the second closing element 4 is detected. The position of the slide part 5 is captured via a fourth position detector 15.4, which preferably detects the accommodation cylinder 5f which is connected to the slide part 5, guided out of the first valve housing 1a and disposed between the first valve housing 1a and the device 100.

The device 100 according to the present invention (drive device), which is depicted in FIG. 2 in a condition which results from the closed position of the double seat valve 1, in relation to the vertical normal condition, has in the interior of a first housing 101, disposed in the lower region which is formed by a pot-shaped first and a pot-shaped second housing part 101a, 101b, a pot-shaped first drive piston 103 fixedly connected to the first displacement rod 3a, and a third piston 105 fixedly connected to the third displacement rod 5a. The third displacement rod 5a, realised as a hollow rod and in connection with the third drive piston 105, is sealingly penetrated by the first displacement rod 3a. The drive pistons 103, 105 receive a first spring 107 between themselves, they are pressurised by pressure medium and displaceable against the force of the prestressed spring 107, wherein the latter is preferably realised as a spring packet with an outer spring 107', a middle one 107'' and an inner one 107''' (FIG. 4). The first drive piston 103 is received in the first housing part 101a, and is sealingly guided at the circumference side there by way of a first piston seal 111. The third drive piston 105 is received in the second housing part 101b, and is sealingly guided at the circumference side there by way of a third piston seal 113. A first bottom part 101c of the first housing part 101a has a central passage opening 101e, and a second bottom part 101d of the second housing part 101b has a second passage opening 101f. A connection ring 101h centres and joins the inside periphery surfaces of the housing parts 101a, 101b, wherein the connection between the latter ones is preferably by substance to substance bond. The first bottom part 101c has an annular lug 101g, enclosing the first passage opening 101e and extending axially away from the second bottom part 101d, via which there is a detachable connection at the outside with a pot-shaped second housing 102. A plug 118 for ventilation and deventilation, which is preferably arranged above the connection ring 101h in the first housing part 101a, provides for ventilation and deventilation of the space existing between the drive pistons 103, 105 during the stroke movements thereof.

The second housing 102 has a second drive piston 104, fixedly connected with the second displacement rod 4a, displaceable against the force of a second spring 108 and pressurised by pressure medium, wherein the second spring 108 is supported at the other side directly or indirectly on the first drive piston 103, and the second displacement rod 4a is sealingly guided through the first displacement rod 3a which is connected to the first drive piston 103. A fourth drive piston 106, pressurised by pressure medium and preferably being sleeve-shaped is furthermore arranged in the second housing 102, which is sealingly guided in the second housing 102 by way of a fourth piston seal 114 and which sealingly embraces the second drive piston 104 on the circumference surface thereof which receives a second piston seal 11, and is adapted to be displaced in the direction of the first drive piston 103 for engagement in a catching connection with the second drive piston 104. At its end facing away from the first drive piston 103, the fourth drive piston 106 is provided with an inside recess 106a, which forms the catching connection with the second drive piston 104 on the one hand, and a twelfth contact surface 106.1 for the same on the other hand.

The second drive piston 104 is displaceable with respect to the first drive piston 103 in a manner that is axially limited in both directions, and in each case against the force of the second spring 108. This ability to be displaced is achieved in that the first drive piston 103 has a pot-shaped first piston shaft 103a, which is detachably connected with the first displacement rod 3a in the region of a pot bottom 103c and is sealingly penetrated by the second displacement rod 4a there. In a central, cylindrical recess 103b stepping into the first piston shaft 103a from out the open side is arranged the second spring 108, which is supported under prestress on the pot bottom 103c via a first abutment disc 109 at the one side, and on the first piston shaft 103a via a second abutment disc 110 at the other side, wherein the second displacement rod 4a penetrates the abutment discs 109, 110 in an axially displaceable manner and is adapted to be displaced in the direction of the second spring 108 for engagement in a catching connection with the respective abutment disc 109, 110 that is on the run. An attachment ring 103f is screwed into the open end of the cylindrical recess 103b which forms the abutment for the upper, second abutment disc 110 and ensures the prestress of the second spring 108.

In the region of the leaving end of the pot-shaped first piston shaft 103a is provided a transversal rod 103d diametrically bridging over the cylindrical recess 103b, which penetrates there a sleeve-shaped second piston shaft (104a) fixedly connected to the second drive piston (104) within a slot-like shaped cross bore (104b) in such a way that it can be axially displaced in a limited manner, and that the transverse rod (103d) is fixedly connected to the first feedback rod 103e.

A housing bottom 102a of the second housing 102 is connected with the control unit 30, wherein the housing bottom 102a has a central third passage opening 102b in which a second feedback rod 104c fixedly connected to the second drive piston 104, realised as a hollow rod and engaging into the control unit 30, is sealingly guided. The latter is penetrated by the first feedback rod 103e that is fixedly connected directly or indirectly to the first drive piston 103 and engaging into the control unit 30, and it forms a ring channel 115 with the same. The subdivision of the housing 101/102 into the capsulated first housing 101 and second housing 102 detachable from the latter permits, in connection with the above described inner design of the second housing 102, a disassembly of all the driving parts of the second housing towards the upside, the displacement rods 3a, 4a and 5a each being screwed into the first housing 101 from the downside.

A first pressure medium space 120 is limited by the housing 101/102 and the first drive piston 103 at the one side, and by the second and the fourth drive piston 104, 106 at the other side. In this, the ring channel 115 between the second displacement rod 104c and the first displacement rod 103e runs out into the first pressure medium space 120 and it is used as a first pressure medium channel 115 for a first pressure medium flow D1. A second pressure medium space 121 is limited by the second housing 102 at the one side, and by the second and the fourth drive piston 104, 106 at the other side. In this, a second pressure medium channel 116 destined for a second pressure medium flow D2 runs out into the second pressure medium space 121, and this channel is guided thereto via a connection piece on the second housing 102. A third pressure medium space 122 is limited by the second housing part 101b of the first housing 101 at the one side, and by the third drive piston 105 at the other side. In this, a third pressure medium channel 117 destined for a third pressure medium flow D3 runs out into the second pressure medium space 122, wherein this channel is guided thereto via a connection piece on the first housing part 101b.

In the pressurization of the first pressure medium space 120 via the first pressure medium channel 115 with the first pressure medium flow D1 for initiating the opening movement of the double seat valve 1 (FIGS. 3, 3a), the two drive pistons 103, 104 move away from each other when relatively seen, wherein at first the second drive piston 104 is displaced towards the upside against the prestress force of the second spring 108 up to the rest of its eight contact surface 104.1 on the twelfth contact surface 106.1 on the fourth drive piston 106, and the first drive piston 103 with its fifth contact surface 103.1 is released only subsequently from a first contact surface 101a.1 on the first bottom part 101c and moves towards the downside, until its sixth contact surface 103.2 comes to rest on an eleventh contact surface 105.2 on the third drive piston 105 after the completion of the full opening stroke H (FIGS. 4, 4a). The upward movement of the second drive piston 104, which represents a so-called "pick-up stroke h", is reproduced for instance via the distance between the pot bottom 103c and the first abutment disc 109. During the pick-up stroke h, the fourth drive piston 106 remains permanently secured with its fourteenth contact surface 106.3 on a fourth contact surface 102.1 on the housing bottom 102a. By this movement process, the closing elements 3, 4 are at first moved together about the pick-up stroke h (FIG. 3a), subsequently advanced into each other, wherein the first closing element 3 is received in the recess 4f disposed in the second closing element 4, then advanced against each other with the force resulting from the prestress force of the second spring 108, and finally transferred into the fully open position H together (FIGS. 4, 4a). During the opening movement, the pick-up stroke h guides at first the second closing element 4 opposite to the later opening stroke H directly to the first closing element 3, so that the latter can approach into the circumference wall 4h of the recess 4f with its first seal 6 without having to bridge over an axial gap. Leakage-free switching is ensured by this.

In the pressurization of the second pressure medium space 121 with the second pressure medium flow D2 via the second pressure medium channel 116 (FIGS. 5, 5a) in order to generate the second partial stroke T2 ensuring the seat cleaning of the second closing element 4, the drive pistons 104, 103 each are displaced in the direction towards the first drive piston 103, until the fourth drive piston 106 rests with its thirteenth contact surface 106.2 on a second contact surface 101a.2 at the front side end of the annular lug 101g. In this, the twelfth contact surface 106.1 on the inside recess 106a takes along the second drive piston 104 towards the downside, wherein the latter is displaced into this direction also solely under the action of the second pressure medium flow, and with its ninth contact surface 104.2 at the downside rests on a seventh contact surface 103.3 which is situated on the front side end of the first piston shaft 103a. Eventually, the second drive piston 104 is secured between the contact surfaces 106.1 and 103.3 with its two front side contact surfaces 104.1 and 104.2, through which the second closing element 4 is displaced towards the downside about the second partial stroke T2, whereas the first closing element 3 remains in its closed position. The downward movement of the second drive piston 104 generating the second partial stroke T2 is reproduced for instance via the distance between the attachment ring 103f and the second abutment disc 110. The second seating area 2a is exposed for the width of a gap by the second partial stroke T2 (FIG. 5a), and the second seat cleaning flow R2 limited in the second choke gap that is formed between the cylindrical second lug 4* on the second closing element 4 and the second seating area 2a (see also FIG. 1a) is guided into the leakage cavity 9 from out the adjacent second valve housing part 1b, and by this it cleans the areas that are exposed at the valve housing- and closing element side.

In the pressurization of the third pressure medium space 122 with the third pressure medium flow D3 via the third pressure medium channel 117 (FIGS. 6, 6a) in order to generate the first partial stroke T1 ensuring the seat cleaning of the first closing element 3 and the slide part 5, the third drive piston 105 moves in the direction towards the first drive piston 103, until it rests with its tenth contact surface 105.1 on a third contact surface 101h.1 on the connection ring 101h. The first partial stroke T1 of the slide part 5 is completed through this, while the first closing element 3 and also the second closing element 4 each remain unmoved in a condition which corresponds to the respective closed position (FIGS. 2, 2a). The first seating area 5e and also the third seating area 2b are exposed for the width of a gap through the first partial stroke T1 (FIG. 6a). Through this, on the one hand the first seat cleaning flow R1 limited in the first choke gap that is formed between the cylindrical first lug 3* on the first closing element 3 and the first seating area 5a (see also FIG. 1a) is guided into the leakage cavity 9 from out the adjacent second valve housing part 1a. Furthermore, on the other hand the third seat cleaning flow R3 limited in the third choke gap that is formed between the cylindrical third lug 5* on the slide part 5 and the third seating area 2b is guided into the leakage cavity 9 from out the adjacent second valve housing part 1a. Through this, the seat cleaning flows R1, R3 clean the areas that are exposed on the valve housing side, the closing element side and the slide part side.

In the closed position of the double seat valve 1 depicted in FIG. 2, the pick-up stroke h, the full opening stroke H, the first partial stroke T1 and also the second partial stroke T2 are in each case determined by the distance provided between associated contact surfaces (pick-up path c; opening path d, first partial stroke path f; second partial stroke path (e-c):

pick-up stroke h: distance c between the twelfth contact surface 106.1 and the eight contact surface 104.1 (h=c);

full opening stroke H: distance d between the sixth contact surface 103.2 and the eleventh contact surface 105.2 (H=d);

first partial stroke T1: distance f between the third contact surface 101h.1 and the tenth contact surface 105.1 (T1=f);

second partial stroke T2: distance e between the thirteenth contact surface 106.2 and the second contact surface 101a.2 minus the distance c between the twelfth contact surface 106.1 and the eight contact surface 104.1 (T2=e−c)

From that which was mentioned above, it will be obvious that different modifications and variants may be realised without diverting from the spirit and the new concept of the present invention. This is to be understood such that no limitation is intended to the embodiments which are depicted and described or only described here. The disclosure is intended to comprise all such modifications which are inside the protection coverage that is called for by the claims.

This completes the description of the preferred and alternate embodiments of the invention. Those skilled in the art may recognize other equivalents to the specific embodiment described herein which equivalents are intended to be encompassed by the claims attached hereto.

This completes the description of the preferred and alternate embodiments of the invention. Those skilled in the art may recognize other equivalents to the specific embodiment described herein which equivalents are intended to be encompassed by the claims attached hereto.

LIST OF REFERENCE SIGNS OF THE USED ABBREVIATIONS

FIGS. 1, 1a, 2, 3a, 4a, 5a, 6

(Double Seat Valve According to Document Number: DE 10 2008 004 597.7-12)
- 1 double seat valve
- 10 valve housing
- 1a first valve housing part
- 1b second valve housing part
- 2 first seat ring
- 2a second seating area (cylindrical seating area)
- 2b third seating area (cylindrical seating area)
- 2c connection opening
- 2d annular first recess
- 2e transition area
- 2h second lead-in chamfer
- 3 first closing element (first slide piston)
- 3* cylindrical first lug
- 3** first end portion
- 3a first displacement rod
- 3a* first pressure compensation piston
- 4 second closing element (second slide piston)
- 4* cylindrical second lug
- 4a second displacement rod
- 4b/4c pipe-shaped shaft
- 4b connection piece
- 4c second pressure compensation piston
- 4d drain bore
- 4f recess
- 4h (cylindrical) circumference wall
- 40 welding boss
- 4a* displacement rod portion
- 4e tie bar
- 4g ring
- 5 annular slide part
- 5* cylindrical third lug
- 5a third displacement rod
- 5b deflection area
- 5c annular second recess
- 5e first seating area (cylindrical seating area)
- 5f accommodation cylinder
- 5g connection bridge
- 6 first seal (radial)
- 7 second seal (radial)
- 8 third seal (radial, in the slide part 5)
- 9 leakage cavity
- 10 valve housing
- 12 first housing seal
- 13 second housing seal
- 14 cylinder seal
- 15.4 fourth position detector
- h pick-up stroke
- H full opening stroke (fully open position)
- K contour of the deflection area 5b
- R1 first seat cleaning flow
- R2 second seat cleaning flow
- R3 third seat cleaning flow
- T1 first partial stroke (first partially open position/first seat cleaning position)
- T2 second partial stroke (second partially open position/second seat cleaning position)

FIGS. 2, 3, 4, 5 and 6

- 15.1 first position detector
- 15.2 second position detector
- 15.3 third position detector
- 20 lantern housing
- 30 control unit
- 100 device (drive device)
- 101/102 housing (drive device)
- 101 first housing
- 101a (pot-shaped) first housing part
- 101a.1 first contact surface (/103.1)
- 101a.2 second contact surface (/106.2)
- 101b (pot-shaped) second housing part
- 101c first bottom part
- 101d second bottom part
- 101e first passage opening
- 101f second passage opening
- 101g annular lug
- 101h connection ring
- 101h.1 third contact surface
- 102 second housing
- 102.1 fourth contact surface (/106.3)
- 102a housing bottom
- 102b third passage opening
- 103 (pot-shaped) first drive piston
- 103.1 fifth contact surface (/101a.1)
- 103.2 sixth contact surface (/105.2)
- 103.3 seventh contact surface (/104.2)
- 103a (pot-shaped) first piston shaft
- 103b cylindrical recess
- 103c pot bottom
- 103d transverse rod
- 103e first feedback rod
- 103f attachment ring
- 104 second drive piston
- 104.1 eighth contact surface (/106.1)
- 104.2 ninth contact surface (/106.3)
- 104a sleeve-shaped second piston shaft
- 104b (slot-shaped) cross bore
- 104c second feedback rod
- 105 third drive piston
- 105.1 tenth contact surface (/101d.1)
- 105.2 eleventh contact surface (/103.2)
- 106 (sleeve-shaped) fourth drive piston 106.1 twelfth contact surface (/104.1)
106.2 thirteenth contact surface (/101a.2)
106.3 fourteenth contact surface (/102.1)
106a inside recess
107 first spring (spring packet)
107' outer spring
107" middle spring
107''' inner spring
108 second spring
109 first abutment disc
110 second abutment disc
111 first piston seal
112 second piston seal
113 third piston seal
114 fourth piston seal
115 first pressure medium channel (ring channel)
116 second pressure medium channel
117 third pressure medium channel
118 ventilation and deventilation plug
120 first pressure medium space
121 second pressure medium space
122 third pressure medium space
c pick-up path (c=h)
d full opening stroke (d=H)
e second partial stroke path (T2=e−c)
f first partial stroke path (T1=f)
D1 first pressure medium flow
D2 second pressure medium flow
D3 third pressure medium flow

The invention claimed is:

1. A device (100) for driving a double seat valve (1) with first and second closing elements (3, 4), arranged in series and displaceable with respect to each other, which in the closed position of the double seat valve (1) prevent the overflow of fluids from a first valve housing part (1a; 1b) into a second valve housing part (1b; 1a) through a connection opening (2c) connecting said first and second valve housing parts (1, 1b) of a valve housing (10) with each other, and which in the closed position as well as in the open position of the double seat valve (1) limit a leakage cavity (9) that is connected to an exterior of the double seat valve (1), with an axially displaceable, annular slide part (5), which in the closed position as well as in the open position of the double seat valve (1) is sealingly received radially at an outer side in a third seating area (2b) formed in the connection opening (2c) and which at an inner side forms a first seating area (5e) which runs coaxially to the connection opening (2c) and is in fluid communication connected with the connection opening (2c), wherein in the closed position, the first closing element (3) is sealingly received in the first seating area (5e) and during its opening movement generated by the device (100) sealingly abuts the second closing element (4), which is associated to a second seating area (2a) realised in the connection opening (2c) and which is realised greater in diameter than the first closing element (3), and the first closing element (3) is also transferred into an open position (H) in the further opening movement, with seat cleaning positions for the first and second closing elements (3, 4) and the annular slide part (5), each generated by the device (100) for rinsing their coaxial seating areas (5e, 2a, 2b), wherein the second closing element (4) is adapted to be transferred into its respective seat cleaning position by a second partial stroke (T2) in the direction of the opening movement, and the slide part by a first partial stroke (T1) directed opposite to the opening movement, with telescopically interlacing first, second and third displacement rods (3a, 4a, 5a) guided outwardly out of the valve housing (10) and into the device (100) at the side of the first closing element (3), wherein the first displacement rod (3a) is associated to the first closing element (3), the second displacement rod (4a) to the second closing element (4) and the third displacement rod (5a) to the slide part (5), wherein the device (100) comprises inside a housing (101/102)
a pot-shaped first drive piston (103), pressurised by pressure medium and fixedly connected to the first displacement rod (3a) and displaceable against the force of a first spring (107; 107'; 107'''),
a second drive piston (104), pressurised by pressure medium and fixedly connected to the second displacement rod (4a) and displaceable against the force of a second spring (108), the second spring (108) being supported directly or indirectly on the first drive piston (103), and the second displacement rod (4a) being sealingly guided through the first displacement rod (3a) which is realised as a hollow rod in connection with the first drive piston (103),
a sleeve-shaped fourth drive piston (106) pressurised by pressure medium, which sealingly embraces the second drive piston (104) on the circumference surface thereof and is adapted to be brought into engagement in a catching connection with the second drive piston (104) in the direction of the first drive piston (103),
and a third drive piston (105) pressurised by pressure medium and fixedly connected to the third displacement rod (5a) and displaceable against the force of the first spring (107), the third displacement rod (5a), realised as a hollow rod in connection with the third drive piston (105) being sealingly penetrated by the first displacement rod (3a),
wherein the second drive piston (104) is adapted to be axially displaceable in a limited manner in both directions with respect to the first drive piston (103) and in each case against the force of the second spring (108),
wherein the first and the second drive pistons (103, 104) partially limit a first pressure medium volume (120) pressurised by a first flow (D1) of pressure medium,
and wherein the second and the fourth drive piston (104, 106) by their front surfaces each facing away from the first drive piston (103) partially limit a second pressure medium space (121) pressurised by a second flow (D2) of pressure medium and each move in the direction towards the first drive piston (103).

2. The device according to claim 1, wherein the device (100), in the closed position of the first closing element (3) and during the opening movement of the double seat valve (1), guides the second closing element (4) towards the first closing element (3) by a pick-up stroke (h) at first, in that the second drive piston (104) abuts the fourth drive piston (106) after the pick-up stroke (h) when the second drive piston (104) is pressurised by the first flow (D1) of pressure medium.

3. The device according to claim 1, wherein the device (100) actuates the double seat valve (1) in which the annular slide part (5), the first, the second and also the third seating area (5e, 2a, 2b) are each realised cylindrically and the closing elements (3, 4) each as slide pistons.

4. The device according to claim 1, wherein the device (100) actuates the double seat valve (1) in which the second closing element (4) at its end facing the first closing element (3), has a recess (4f) with an essentially cylindrical circumference wall (4h) falling in line with the first seating area (5e), and the recess (4f) is dimensioned such as to sealingly receive the first closing element (3) during the opening movement before the second closing element (4) opens.

5. The device according to claim 1, wherein the device (100) actuates the double seat valve (1), namely with a cylindrical second lug (4*) arranged on the second closing element (4) at the leakage space side, which forms an annular second choke gap with the associated second seating area (2a) after the completion of the second partial stroke (T2), with a cylindrical first lug (3*) arranged on the first closing element (3) as to be facing away from the leakage space side, which forms an annular first choke gap with the associated first seating area (5e) after the completion of the first partial stroke (T1), and with a cylindrical third lug (5*) arranged on the slide part (5) at the leakage space side, which forms an annular third choke gap with the associated third seating area (2b) after the completion of the first partial stroke (T1).

6. The device according claim 1, wherein the device (100) actuates the double seat valve (1), in which a transition area (2e) is provided between the second and the third seating areas (2a, 2b), and in which an annular second recess (5c) in the form of a deflection area (5b) is disposed in the front side of the slide part (5) facing the leakage cavity (9).

7. The device according to claim 1, wherein the first housing (101) is formed by a pot-shaped first housing part and a pot-shaped second housing part (101a, 101b), that the first drive piston (103) is lodged in the first (101a) and the third drive piston (105) in the second housing part (101b) and they are each sealingly guided at the perimeter side there, and receive the first spring (107) between each other, and that a first bottom part (101c) of the first housing part (101a) has a central first passage opening (101e) and a second bottom part (101d) of the second housing part (101b) has a central second passage opening (101f).

8. The device according to claim 7, wherein a connection ring (101h) is provided, which joins and centers centres the lateral areas of the housing parts (101a, 101b) at an inner side, and that the connection between the housing parts (101a, 101b) and the connection ring (101h) is by substance to substance bond.

9. The device according to claim 7, wherein the first bottom part (101c) has an annular lug (101g) enclosing the first passage opening (101e) and extending axially away from the second bottom part (101d), by way of which there is a detachable connection with the pot-shaped second housing (102) at the outer side.

10. The device according to claim 9, wherein a housing bottom (102a) of the second housing (102) is connected with a control unit (30), wherein the housing bottom (102a) has a central third passage opening (102b) in which a second feedback rod (104c), fixedly connected with the second drive piston (104), realised as a hollow rod and engaging into the control unit (30) is sealingly guided, wherein the latter is penetrated by a first feedback rod (103e) that is directly or indirectly fixedly connected to the first drive piston (103) and engaging into the control unit (30).

11. The device according to claim 1, wherein the first drive piston (103) has a pot-shaped first piston shaft (103a), which is detachably connected with the first displacement rod (3a) in the region of the pot bottom (103c) and sealingly penetrated by the second displacement rod (4a) there, that in a central cylindrical recess (103b) engaging in the first piston shaft (103a) from out the open side is disposed the second spring (108), which is supported under prestress via a first abutment disc (109) on the pot bottom (103c) at one side, and via a second abutment disc (110) on the first piston shaft (103a) at another side, wherein the second displacement rod (4a) penetrates the abutment discs (109, 110) in an axially displaceable way, and in the direction towards the second spring (108) it is adapted to be put into engagement in a catching connection with the respective abutment disc (109, 110) that is in the run.

12. The device according to claim 10, wherein a transverse rod (103d) diametrically bridging over the cylindrical recess (103b) is provided in the region of the outlet end of the pot-shaped first piston shaft (103a), that the transverse rod (103d) penetrates there a sleeve-shaped second piston shaft (104a) fixedly connected to the second drive piston (104) within a slot-like shaped cross hole (104b) in such a way that it can be axially displaced in a limited manner, and that the transverse rod (103d) is fixedly connected to the first feedback rod (103e).

13. The device according to claim 1, wherein at its end facing away from the first drive piston (103), the sleeve-shaped fourth drive piston (106) is provided with an inside recess (106a), which forms the catching connection with the second drive piston (104), and a contact surface (106.1) for the same.

14. The device according to claim 1, wherein the piston area of the first drive piston (103) that is effective when pressurised by pressure medium, is greater than the piston area of the second drive piston (104) that is effective when pressurised by pressure medium.

15. The device according to claim 1, wherein a prestress force of the first spring (107) is greater than a prestress force of the second spring (108).

16. The device according to claim 1, wherein the first spring (107) is realised in the form of a spring packet with an outer, a middle and an inner spring (107', 107'', 107''').

17. The device according to claim 1, wherein the first pressure medium space (120) is limited by the housing (101/102) and the first drive piston (103) at one side, and by the second and the fourth drive piston (104, 106) at another side.

18. The device according to claim 17, wherein a first pressure medium channel (115) destined for the first pressure medium flow (D1) runs out into the first pressure medium space (120), wherein this channel is guided thereto in an extension of the second drive piston (104) penetrating the second housing (102).

19. The device according to claim 10, wherein the ring channel between the second feedback rod (104c) and the first feedback rod (103e) runs out into the first pressure medium space (120) and forms a first pressure medium channel (115) for the first pressure medium flow (D1).

20. The device according to claim 1, wherein the second pressure medium space (121) is limited by the second housing (102) at one side, and by the second and the fourth drive piston (104, 106) at another side.

21. The device according to claim 20, wherein a second pressure medium channel (116) runs out into the second pressure medium space (121), wherein this channel is guided thereto via a connection piece on the second housing (102).

22. The device according to claim 1, wherein a third pressure medium space (122) is limited by the first housing (101) at the one side, and by the third drive piston (105) at the other side.

23. The device according to claim 22, wherein a third pressure medium channel (117) runs out into the third pressure medium space (122), wherein this channel is guided thereto via a connection piece on the first housing (101).

24. The device according to claim 1, wherein in order to secure the closed position of the first closing element (3), the first drive piston (103) rests on a first contact surface (101a.1) formed on the first housing (101) with a further contact surface (103.1) under a prestress force of the first spring (107).

25. The device according to claim 1, wherein in order to limit the open position of the closing elements (3, 4), the first drive piston (103) rests on a contact surface (105.2) formed on the third drive piston (105) with a further contact surface (103.2).

26. The device according to claim 1, wherein in order to limit the second partial stroke (T2), the fourth drive piston (106) rests on a contact surface (101*a*.2) formed on the first housing (101) with a further contact surface (106.2).

27. The device according to claim 1, wherein in order to limit the first partial stroke (T1), the third drive piston (105) rests on a contact surface (101*h*.1) formed on the first housing (101) with a further contact surface (105.1).

28. The device according to claim 1, wherein in order to secure the closed position of the slide part (5), the slide part (5) rests on the transition area (2*e*) that bridges over the first and the second seating area (2*a*, 2*b*).

29. The device according to claim 10, wherein at least three position detectors (15.1, 15.2, 15.3) are disposed in the control unit (30), wherein a first and a second position detector (15.1, 15.2) are associated to the first feedback rod (103) and detect the closed and the open position, and a third position detector (15.3) is associated to the second feedback rod (104*c*) and detects the second partial stroke (T2).

30. The device according to claim 29, wherein a fourth position detector (15.4) is disposed on a lantern housing (20) connecting the valve housing (10) with the first housing (101), which detects the first partial stroke (T1) via the third displacement rod (5*a*) (connection bridge (5*g*)) connected to the slide part (5).

\* \* \* \* \*

UNITED STATES PATENT AND TRADEMARK OFFICE
CERTIFICATE OF CORRECTION

| | |
|---|---|
| PATENT NO. | : 8,469,055 B2 |
| APPLICATION NO. | : 12/812933 |
| DATED | : June 25, 2013 |
| INVENTOR(S) | : Burmester et al. |

It is certified that error appears in the above-identified patent and that said Letters Patent is hereby corrected as shown below:

In the claims

Column 21, Line 31, delete "centres the-"

Signed and Sealed this
Thirteenth Day of August, 2013

Teresa Stanek Rea
*Acting Director of the United States Patent and Trademark Office*